(12) United States Patent
Yamada et al.

(10) Patent No.: US 8,742,710 B2
(45) Date of Patent: Jun. 3, 2014

(54) ROTARY ELECTRIC MACHINE SYSTEM

(75) Inventors: Eiji Yamada, Owariasahi (JP); Kenji Hiramoto, Owariasahi (JP); Hideo Nakai, Nisshin (JP); Norimoto Minoshima, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/422,184

(22) Filed: Mar. 16, 2012

(65) Prior Publication Data

US 2012/0235621 A1 Sep. 20, 2012

(30) Foreign Application Priority Data

Mar. 17, 2011 (JP) .................................. 2011-059860

(51) Int. Cl.
*H02P 7/00* (2006.01)

(52) U.S. Cl.
USPC ... 318/432; 318/254.1; 318/430; 318/400.01; 318/400.17; 318/400.2

(58) Field of Classification Search
USPC ......... 318/245, 254.1, 430, 432, 400.01, 139, 318/400.17, 400.2
See application file for complete search history.

(56) References Cited

U.S. PATENT DOCUMENTS

| 7,358,698 B2 | 4/2008 | Seguchi et al. | |
| 2010/0250067 A1* | 9/2010 | Matsumura et al. | 701/41 |
| 2010/0259136 A1* | 10/2010 | Hiramoto et al. | 310/68 D |

FOREIGN PATENT DOCUMENTS

| JP | 2007-185082 A | 7/2007 |
| JP | 2008545363 A | 12/2008 |
| JP | 2009-112091 A | 5/2009 |
| JP | 2010-098908 A | 4/2010 |
| JP | 2010-110079 A | 5/2010 |
| JP | 2011041433 A | 2/2011 |
| JP | 2012-170256 A | 9/2012 |
| WO | 2007003868 A1 | 1/2007 |

* cited by examiner

*Primary Examiner* — Eduardo Colon Santana
*Assistant Examiner* — Iftekhar Mustafa
(74) *Attorney, Agent, or Firm* — Gifford, Krass, Sprinkle, Anderson & Citkowski, P.C.

(57) ABSTRACT

A rotary electric machine system includes: a stator that has multi-phase stator coils and that generates stator magnetomotive forces based on respective stator currents having different phases supplied to the multi-phase stator coils; a rotor on which rotor coils are wound such that magnetic poles are formed by rotor currents generated in response to the stator magnetomotive forces generated by the stator; a regulating unit that regulates a flow direction of each of the rotor currents to one direction to thereby regulate a polarity of each of the magnetic poles; and a control unit that controls currents supplied to the stator coils on the basis of a target torque. The control unit superimposes a pulse on the stator currents to adjust the ratio of each of the stator currents and each of the rotor currents so as to minimize a copper loss in the stator and the rotor.

14 Claims, 7 Drawing Sheets

ROTARY ELECTRIC MACHINE SYSTEM

CROSS-REFERENCE TO RELATED APPLICATIONS

This application claims priority to Japanese Patent Application No. 2011-059860 filed on Mar. 17, 2011, which is incorporated herein by reference in its entirety including the specification, drawings and abstract.

BACKGROUND OF THE INVENTION

1. Field of the Invention

The invention relates to a rotary electric machine system that includes a stator having stator coils and a rotor having rotor coils, and that controls stator currents to rotate the rotor.

2. Description of Related Art

Japanese Patent application Publication No. 2009-112091 (JP-A-2009-112091) describes a rotary electric machine. In the rotary electric machine, rotor coils are provided for a rotor, and revolving magnetic fields that include space harmonics and that are generated by a stator are used to generate induced currents in the rotor coils. By so doing, rotor rotation torque is generated to thereby rotate the rotor.

With the above rotary electric machine, no magnet is required, and it is possible to obtain an efficient rotary electric machine at relatively low cost.

Note that techniques related to the invention are described not only in JP-A-2009-112091 but also in Japanese Patent Application Publication No. 2007-185082 (JP-A-2007-185082), Japanese Patent Application Publication No. 2010-98908 (JP-A-2010-98908) and Japanese Patent Application Publication No. 2010-110079 (JP-A-2010-110079).

SUMMARY OF THE INVENTION

This invention provides a rotary electric machine system that improves the efficiency of a rotary electric machine. Particularly, provides a rotary electric machine system that reduces a loss as much as possible in order to improve the efficiency of an in-vehicle battery.

An aspect of the invention relates to a rotary electric machine system. The rotary electric machine system includes: a stator that has multi-phase stator coils and that generates stator magnetomotive forces based on respective stator currents having different phases supplied to the multi-phase stator coils; a rotor on which rotor coils are wound such that magnetic poles are formed by rotor currents generated in response to the stator magnetomotive forces generated by the stator; a regulating unit that regulates a flow direction of each of the rotor currents to one direction to thereby regulate a polarity of each of the magnetic poles; and a control unit that controls currents supplied to the stator coils on the basis of a target torque. The control unit superimposes a pulse on the stator currents to adjust the ratio of each of the stator currents and each of the rotor currents so as to minimize a copper loss in the stator and the rotor.

According to the above aspect, a pulse is superimposed on the stator currents to make it possible to adjust the ratio of the stator currents and the rotor currents so as to minimize a copper loss in the stator and the rotor. Thus, it is possible to improve the efficiency of the rotary electric machine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1:
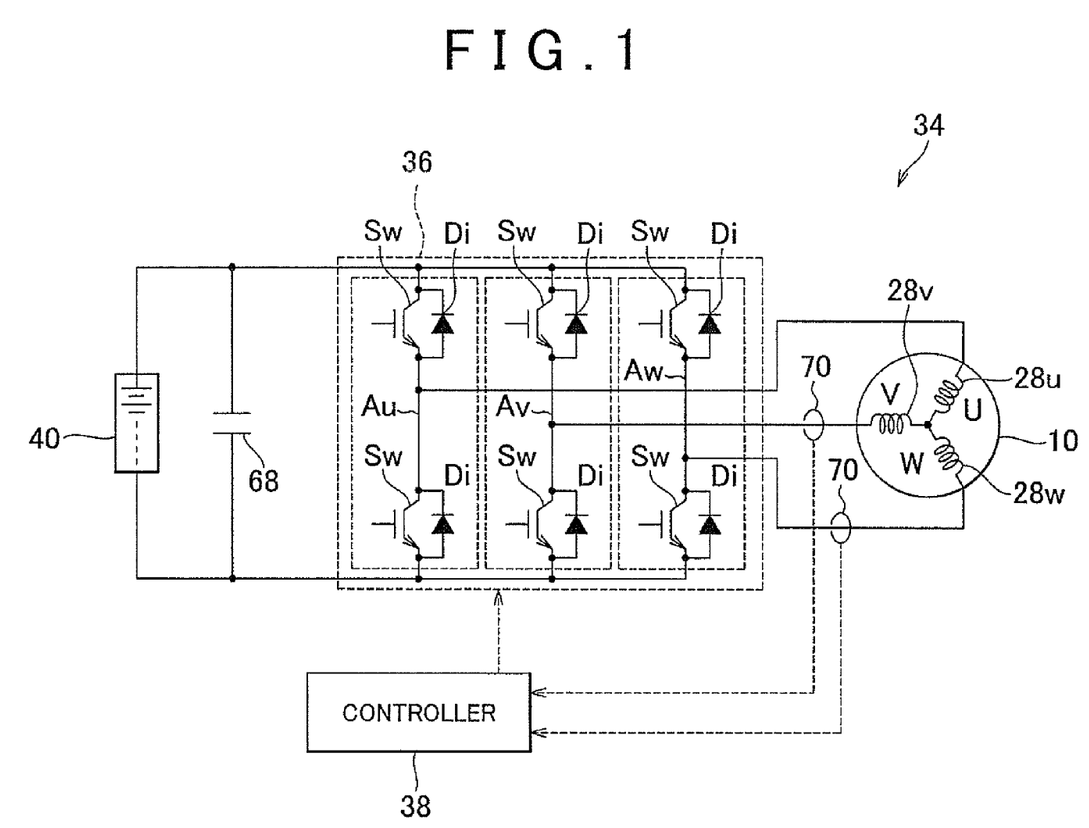
FIG. 1 is a view that shows the schematic configuration of a rotary electric machine system according to an embodiment of the invention.

FIG. 1 is a view that shows the overall configuration of a rotary electric machine system according to the embodiment. The rotary electric machine system 34 includes a rotary electric machine 10, an inverter 36, a controller 38 and an electrical storage device 40. The rotary electric machine 10 functions as an electric motor or a generator. The inverter 36 controls driving currents supplied to the rotary electric machine 10. The controller 38 controls switching of the inverter 36. Note that the rotary electric machine 10 is also called a motor or a motor generator.

The rotary electric machine system 34 is, for example, mounted on a vehicle as a vehicle driving power generating device. The vehicle may be a hybrid vehicle, a fuel-cell vehicle, an electric vehicle, or the like. The hybrid vehicle includes an engine and a drive motor as driving sources.

The electrical storage device 40 is usually formed of a chargeable and dischargeable secondary battery, such as a lithium ion battery and a nickel metal hydride battery. The output voltage of the electrical storage device 40 is, for example, about 300 to 500 V, and the output is supplied to the inverter 36. Here, it is also applicable that a DC/DC converter is arranged between the electrical storage device 40 and the inverter 36 and the DC/DC converter steps up the voltage of the electrical storage device 40 and then supplies the stepped-up voltage to the inverter 36. In this case, the input voltage of the inverter 36 may be changed on the basis of the output torque of the rotary electric machine 10.

The positive electrode and negative electrode of the electrical storage device 40 are respectively connected to the positive electrode bus and negative electrode bus of the inverter 36. A capacitor 68 is connected between the positive electrode bus and the negative electrode bus. The capacitor 68 stabilizes the voltage between the positive electrode bus and the negative electrode bus (inverter input voltage).

The inverter 36 includes three U-phase, V-phase and W-phase arms Au, Av and Aw. Each of the three-phase arms Au, Av and Aw is formed of two serially-connected switching elements Sw. A power transistor, such as an IGBT, is usually used as each switching element Sw. In addition, a diode Di for passing current in a direction opposite to the direction of current that the switching element Sw passes is connected in parallel with each switching element Sw. Then, the midpoints of the arms Au, Av and Aw are respectively connected to one ends of the corresponding phase stator coils 28$u$, 28$v$ and 28$w$ of the rotary electric machine 10. Among the stator coils 28$u$, 28$v$ and 28$w$, the stator coils of the same phase are connected in series with one another, and the other ends of the stator coils 28$u$, 28$v$ and 28$w$ of the different phases are connected to one another at a neutral point.

The controller 38, for example, calculates the target torque of the rotary electric machine 10 on the basis of an output torque command signal input from an accelerator pedal sensor (not shown) of the vehicle, and controls switching operations of the switching elements Sw such that the output torque of the rotary electric machine 10 coincides with the target torque.

Therefore, signals that indicate current values detected by current sensors 70 provided for at least two-phase stator coils (for example, 28$v$ and 28$w$) among the three-phase stator coils and a signal that indicates the position (rotation angle θ) of the rotor 14 of the rotary electric machine 10, detected by a rotation angle detecting unit 82 (FIG. 4), such as a resolver, are input to the controller 38. Then, the controller 38 controls the on/off states of the switching elements Sw on the basis of the rotation angle θ of the rotor 14 to control the phases of currents flowing to the three-phase stator coils 28$u$, 28$v$ and 28$w$, and executes PWM control over the switching elements Sw to control the amplitudes of currents flowing through the three-phase stator coils 28$u$, 28$v$ and 28$w$ to thereby control the output torque of the rotary electric machine 10.

Note that the controller 38 includes a microcomputer that has a CPU, a memory, and the like, and may be formed of a plurality of controllers divided function by function.

In this way, the controller 38 converts direct-current power from the electrical storage device 40 to three U-phase, V-phase and W-phase alternating-current powers by switching the switching elements Sw that constitute the inverter 36 to supply the three-phase stator coils 28$u$, 28$v$ and 28$w$ with the three-phase alternating-current powers. Thus, it is possible to control the output torque of the rotor 14 (FIG. 2) by controlling the phases (advances) and amplitudes of alternating currents flowing through the stator coils 28$u$, 28$v$ and 28$w$.

Figure 2:
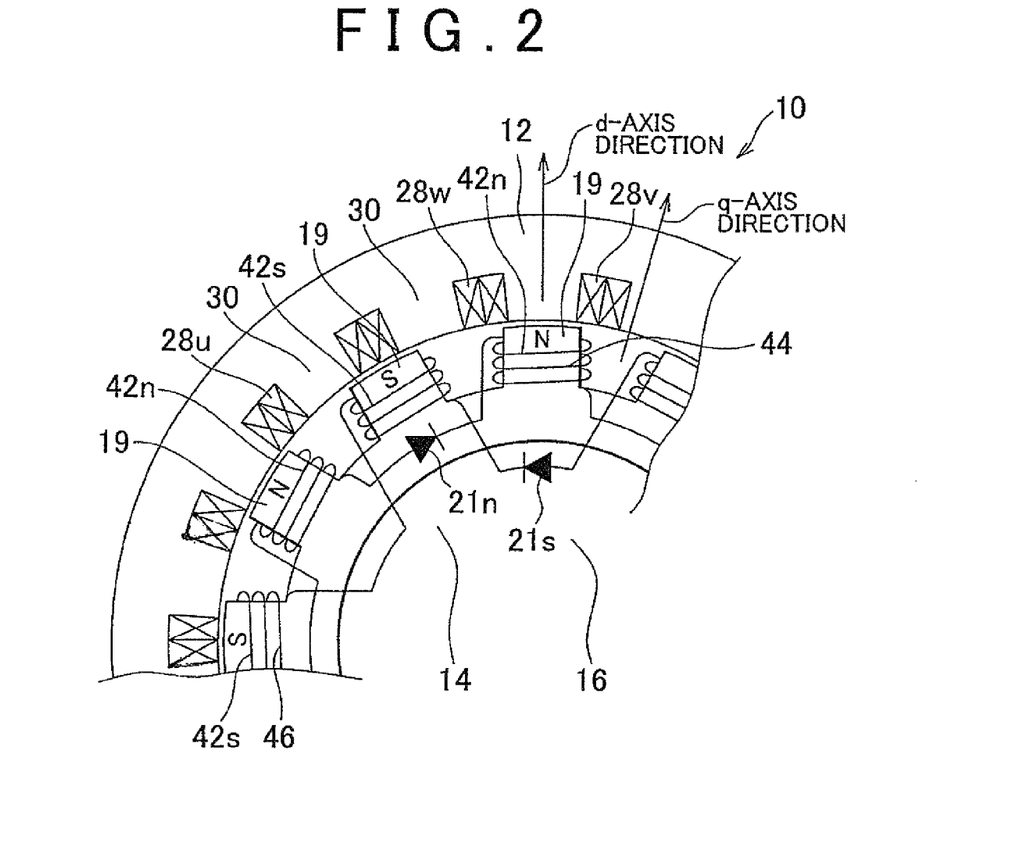
FIG. 2 is a schematic view that partially shows a portion at which a stator faces a rotor in the embodiment of the invention.

FIG. 2 shows the configuration of the rotary electric machine 10. The rotary electric machine 10 includes a stator 12 and the rotor 14 that are arranged so as to face each other in the radial direction. The rotor 14 is arranged concentrically with the stator 12 on the inner side of the stator 12.

In the stator 12, teeth 30 that are directed toward the center and that are provided at predetermined intervals at multiple portions in the circumferential direction of an annular stator core, and the stator coils 28$u$, 28$v$ and 28$w$ are respectively wound around the teeth 30 by concentrated winding.

On the other hand, in the rotor 14, salient poles 19 that protrude radially outward are provided at multiple portions in the circumferential direction of a cylindrical rotor core 16, and a plurality of first rotor coils 42$n$ respectively wound around the first-group salient poles 19 alternately arranged in the circumferential direction constitute a first rotor coil circuit 44. In addition, a plurality of second rotor coils 42$s$ respectively wound around the second-group salient poles 19 respectively adjacent to the first-group salient poles 19 constitute a second rotor coil circuit 46. Then, one diode 21$n$ is arranged in the first rotor coil circuit 44, and one diode 21$s$ is arranged in the second rotor coil circuit 46. By so doing, the current directions in which current flows in the first rotor coil circuit 44 and the second rotor coil circuit 46 are determined. Note that, in terms of regulating the current directions, the above configuration is the same as the configuration that the diodes 21$n$ and 21$s$ are respectively connected one by one to the first rotor coils 42$n$ and the second rotor coils 42$s$ respectively wound around the salient poles 19.

Then, one-way currents respectively flow through the corresponding rotor coils 42$n$ and 42$s$ because of induced electromotive forces generated by revolving magnetic fields that include space harmonics and that are generated by the stator 12, and the directions of currents flowing through any adjacent rotor coils 42$n$ and 42$s$ in the circumferential direction of the rotor 14 are alternately varied, so the polarities of any adjacent salient poles 19 are opposite. In the state shown in the drawing, the north pole is formed at the distal end of each salient pole 19 of the first rotor coil circuit 44, and the south pole is formed at the distal end of each salient pole 19 of the second rotor coil circuit 46.

Here, the sum of the widths w the diameters of circles respectively formed about the centers of the rotor coils 42) of the rotor coils 42$n$ and 42$s$ in the circumferential direction of the rotor 14 (w×number p of the salient poles 19) is set so as to be shorter than the width corresponding to 180° in the electric angle of the rotor 14 (π×r (radius)), and the rotor coils 42$n$ and 42$s$ are respectively wound around the salient poles 19 by short pitch winding. In the present embodiment, the sum of the widths w×p of the rotor coils 42$n$ and 42$s$ in the circumferential direction of the rotor 14 is equal to or substantially equal to the width corresponding to 90° in the electric angle of the rotor 14.

Figure 3:
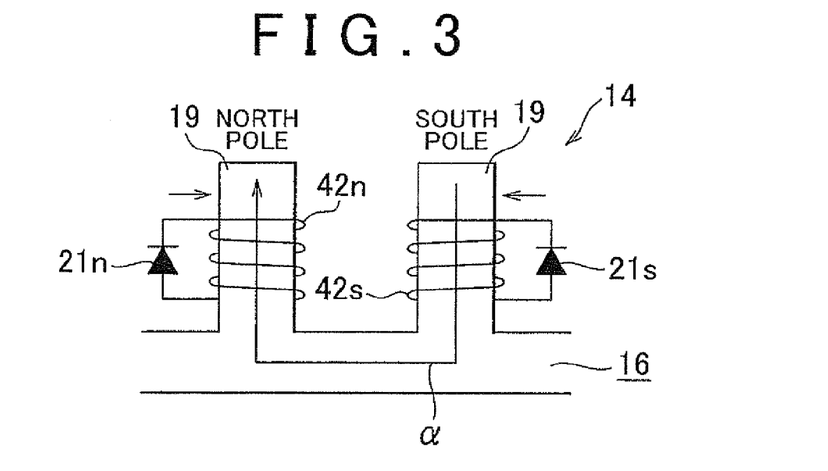
FIG. 3 is a schematic view that shows a state where a magnetic flux passes in the rotor in the embodiment of the invention.

Owing to any adjacent two salient poles 19 of the rotor 14, as shown by the schematic view shown in FIG. 3, induced currents of which the directions are regulated by the diodes 21$n$ and 21$s$ flow through the rotor coils 42$n$ and 42$s$ respectively wound around the two salient poles 19, a magnetic flux passes as indicated by the arrow α in FIG. 3, and any adjacent salient poles 19 are magnetized so as to have different magnetic poles. The flow directions of currents are determined by the diodes 21$n$ and 21$s$, so the salient poles 19 are constantly magnetized as magnetic poles having the fixed polarities.

Figure 4:
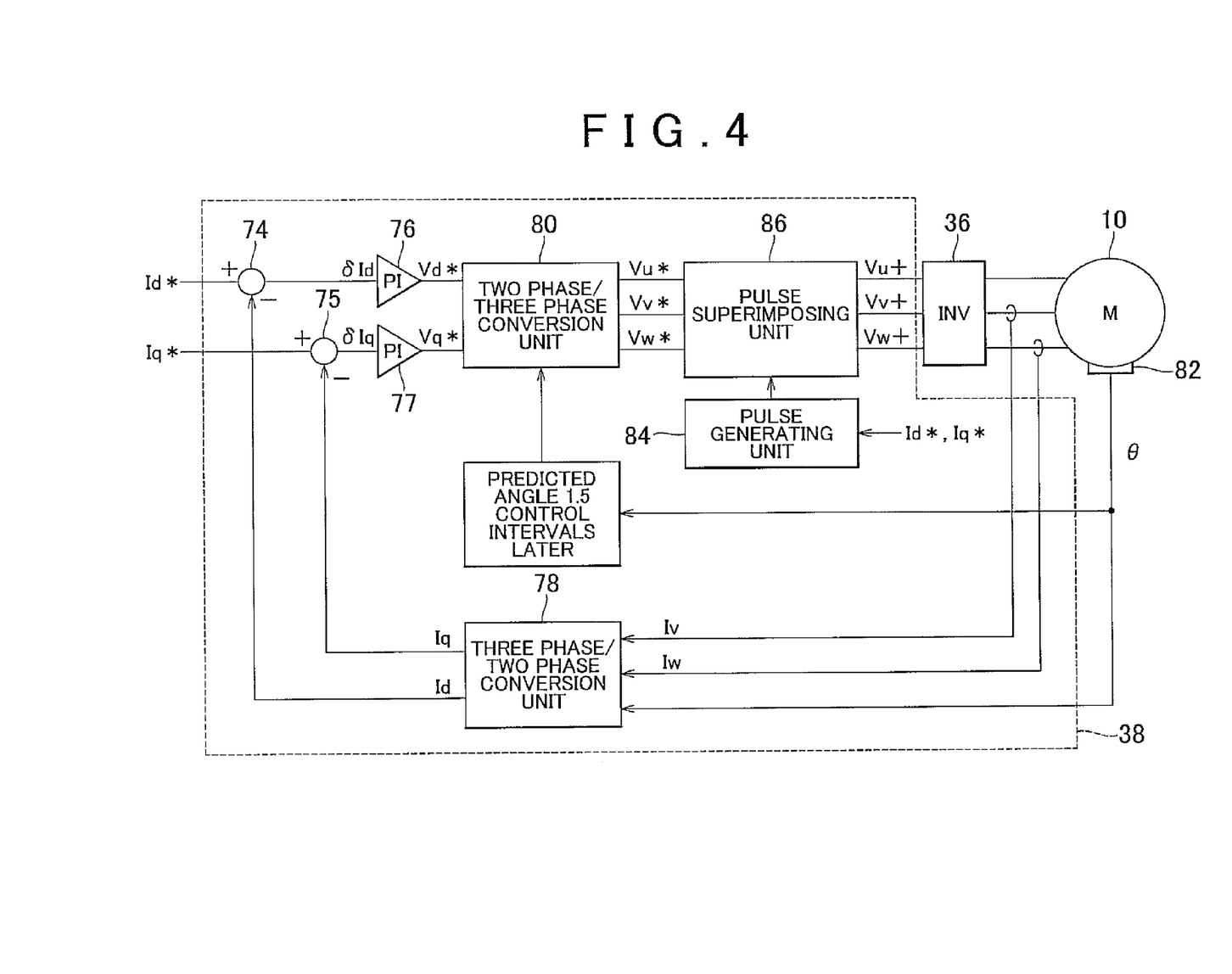
FIG. 4 is a block diagram that shows the configuration of a controller in the embodiment of the invention.

FIG. 4 is a view that shows the configuration of an inverter control unit in the controller 38. The controller 38 includes a current command calculation unit (not shown), a pulse generating unit 84, a pulse superimposing unit 86, subtracting units 74 and 75, PI operation units 76 and 77, a three phase/two phase conversion unit 78, a two phase/three phase conversion unit 80, a PWM signal generating unit (not shown) and a gate circuit (not shown). In addition, the rotation angle detecting unit 82 is provided for the rotary electric machine 10, and detects the rotor position (angle) θ.

The current command calculation unit calculates current command values Id* and Iq* corresponding to the d axis and the q axis in known vector control in accordance with a prepared table, and the like, on the basis of the torque command value (target torque) of the rotary electric machine 10, calculated in response to an acceleration command (output torque command) input from a user. As shown in FIG. 2, the d axis is set in the winding central axis direction of each of the rotor coils 42$n$ and 42$s$ in the circumferential direction of the rotary electric machine 10, and the q axis is set in a direction advanced by 90 degrees in electric angle with respect to the d axis.

The three phase/two phase conversion unit 78 calculates a d-axis current value Id and a q-axis current value Iq, which are two-phase currents, from the rotation angle θ of the rotary electric machine 10, detected by the rotation angle detecting unit 82 provided for the rotary electric machine 10, and the two-phase currents (for example, V-phase and W-phase currents Iv and Iw) detected by the current sensors 70.

The current command values Id* and Iq* calculated by the current command calculation unit are respectively supplied to the subtracting units 74 and 75. The subtracting units 74 and 75 obtain deviations δId and δIq of the current command values Id* and Iq* from the d-axis current Id and the q-axis current Iq supplied from the three phase/two phase conversion unit 78. The deviations δId and δIq are respectively input to the PI operation units 76 and 77.

The PI operation units 76 and 77 respectively perform PI operation over the input deviations δId and δIq by a predetermined gain and then calculate a d-axis voltage command value Vd* and a q-axis voltage command value Vq* that bring the measured d-axis current and q-axis current into coincidence with the targets.

The two phase/three phase conversion unit 80 converts the voltage command values Vd* and Vq* input from the PI operation units 76 and 77 to three U-phase, V-phase and W-phase voltage command values Vu*, Vv* and Vw* using a predicted angle that is obtained from the rotation angle θ of the rotary electric machine 10 and that is predicted as a position 1.5 control intervals later.

These voltage command values Vu*, Vv* and Vw* are input to the pulse superimposing unit 86. The pulse superimposing unit 86 superimposes a pulse supplied from the pulse generating unit 84 on the voltage command values Vu*, Vv* and Vw* to convert the voltage command values Vu*, Vv* and Vw* to three-phase voltage command values Vu+, Vv+ and Vw+ on which a pulse is superimposed. Note that a pulse is superimposed on a command value and a pulse is superimposed by adding or subtracting a numeric value corresponding to the pulse. In addition, the pulse generating unit 84 calculates corresponding stator currents and corresponding rotor currents from the d-axis current command value and the q-axis current command value determined through vector control, and generates a pulse to be superimposed on three-phase stator currents such that the ratio of each of the stator currents and each of the rotor currents becomes a predetermined value. Generating a pulse will be described later. In this way, the ratio of each of the stator currents and each of the rotor currents is the ratio of each of the stator currents and each of the rotor currents, which are required to generate torque based on a single torque command, and is synonymous with the ratio of each of stator magnetomotive forces and each of rotor magnetomotive forces. The ratio of each of the stator currents and each of the rotor currents is the ratio of each stator current for obtaining a predetermined magnetomotive force in one magnetic pole of the stator and each rotor current for obtaining a predetermined magnetomotive force in one magnetic pole of the rotor; however, any magnetic poles are placed in substantially the same state during rotation of the rotary electric machine, so the ratio of each of the stator currents and each of the rotor currents is the ratio of currents for obtaining predetermined magnetomotive forces at the stator side of the rotary electric machine and currents for obtaining predetermined magnetomotive forces at the rotor side of the rotary electric machine as a whole.

The voltage command values Vu+, Vv+ and Vw+ are converted into PWM signals having corresponding duty ratios by the PWM signal generating unit (not shown), and the PWM signals are output to the gate circuit (not shown). The gate circuit executes on/off control over the corresponding switching elements Sw on the basis of the three-phase PWM signals. In this way, the controller 38 controls the stator coils 28u, 28v and 28w to control the inverter 36 such that the d-axis current Id and q-axis current Iq flowing in the rotary electric machine 10 respectively coincide with the current command values Id* and Iq*, and the rotary electric machine 10 is controlled such that the output torque coincides with the target torque.

Note that, in FIG. 4, a pulse is superimposed on the three-phase voltage command values Vu*, Vv* and Vw*; instead, a pulse may be superimposed on the current command values Id* and Iq*.

The output torque of the rotary electric machine 10 is the sum of a torque owing to induced currents and a reluctance torque. This may be expressed as follows.

$$\text{Output Torque} = p_n[(M_{rq} \sin \beta/\sqrt{6}N_rN_s)AT_r \cdot AT_s + \{((L_q - L_d)\sin 2\beta)/3N_s^2\}AT_s^2]$$

Here, $p_n$ is the number of pole pairs (four when there is eight poles), $M_{rq}$ is mutual inductance, $L_q$ and $L_d$ are respectively the q-axis inductance and the d-axis inductance, β is a phase (advance), and $N_r$ and $N_s$ are respectively the number of turns of each rotor coil and the number of turns of each stator coil.

Then, the total copper loss of the rotary electric machine 10 is the sum of a rotor copper loss and a stator copper loss. This may be expressed as follows.

$$\text{Total Copper Loss} = p_n\rho\{(L_r/2S_r)AT_r^2 + (2L_s/3S_s)AT_s^2\}$$

Here, ρ is the resistivity of each coil, $S_r$ and $S_s$ are respectively the cross-sectional area of each rotor coil and the cross-sectional area of each stator coil, and $L_r$ and $L_s$ are respectively the length of each rotor coil and the length of each stator coil.

Note that $AT_r$ and $AT_s$ are respectively a rotor magnetomotive force and a stator magnetomotive force, a rotor current and a stator current may be respectively obtained by dividing $AT_r$ and $AT_s$ by the number of turns $N_r$ and $N_s$, and the number of turns $N_r$ and $N_s$ are acquired in advance, so the ratio of the rotor magnetomotive force $AT_r$ and the stator magnetomotive force $AT_s$ is basically the same as the ratio of the rotor current and the stator current. Thus, the rotor magnetomotive force and the stator magnetomotive force in the following description may be read as the rotor current and the stator current.

Here, as is apparent from the above described two mathematical expressions, the output torque is determined from the rotor magnetomotive forces and the stator magnetomotive forces, and a total copper loss is also determined from the rotor magnetomotive forces and the stator magnetomotive forces.

Figure 5:
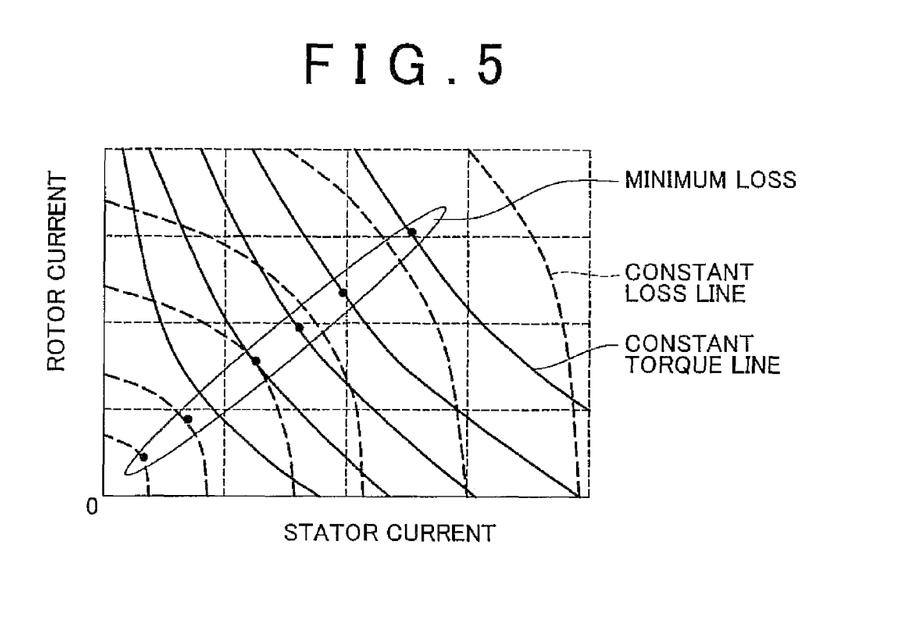
FIG. 5 is a graph that shows an output torque and a loss based on a rotor current and a stator current.

Then, FIG. 5 shows the results obtained by examining the correlation between an output torque and a total copper loss. In the graph, the abscissa axis represents a stator magnetomotive force (stator current), the ordinate axis represents a rotor magnetomotive force (rotor current), constant loss (total loss) lines are indicated by broken lines, and constant torque lines are indicated by solid lines. That is, the constant torque lines are lines at which the output torque is constant, and the constant loss lines are lines at which a total copper loss of the stator and rotor is constant. In the case of obtaining one output torque, the rotary electric machine is driven efficiently when there is the smallest loss, and the region surrounded by the ellipse in the graph is a region in which a loss (total copper loss) is minimal. Note that, in the calculation result of this example, the constant torque line and constant loss line indicated by leader lines in the graph respectively indicate a torque of 50 Nm and a loss of 850 W.

According to this example, it is found that each of the rotor currents, divided by each of the stator currents, is set to a substantially constant value to thereby make it possible to maximize the efficiency. In the graph, if the interval of the vertical lines indicated by broken lines and the interval of the horizontal lines indicated by broken lines are equal to each other, each of the rotor currents, divided by each of the stator currents, is desirably about 1.2.

Figure 6:
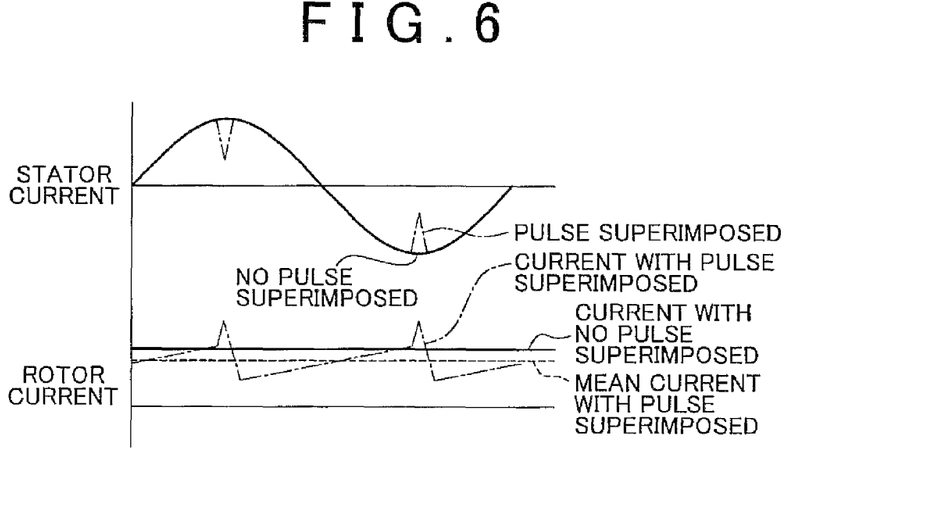
FIG. 6 is a view that shows the relationship between superimposition of a pulse and each rotor current.
Figure 7:
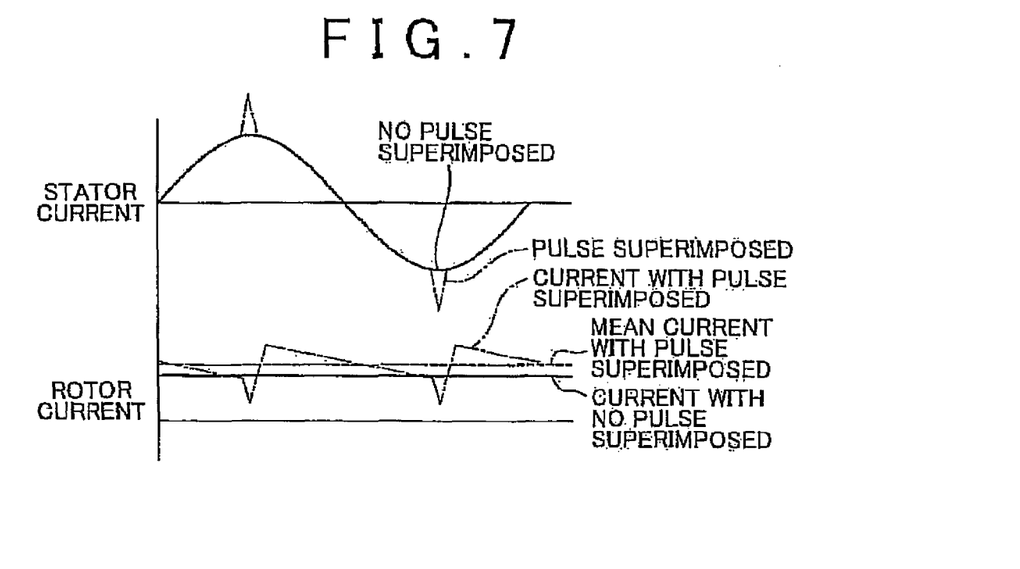
FIG. 7 is a graph that slows the relationship between superimposition of a pulse and each rotor current.

FIG. 6 and FIG. 7 each show a state of stator current and rotor current of one phase. When no pulse is superimposed on the stator current, the rotor current of a predetermined current value flows because of the influence of magnetic fields in response to a variation in the sinusoidal stator current as indicated by solid line in the graph. However, as a pulse is applied to the stator current, magnetic fluxes that link with the rotor coils significantly vary with a variation in the stator current due to the pulse, and the rotor current flows accordingly.

In the example of FIG. 6, a pulse that decreases current is superimposed on the stator current. In this example, a pulse that forms a recess is superimposed at the positions of 90 degrees and 270 degrees in electric angle at which the amplitude is maximal. By so doing, the rotor current increases with a decrease in magnetic fluxes due to a steep decrease in the stator current, and significantly decreases with a steep increase in the stator current thereafter, and then returns to the rotor current with no pulse superimposed. A maximally steep variation due to a pulse is a magnetic flux variation in a direction to decrease the rotor current, and a rotor mean current decreases because of such superimposition of a pulse.

In addition, this is the timing at which the polarities of the other two phases are opposite and currents having half the magnitude respectively flow through the other two phases, so it is possible to prevent an imbalance among the three-phase currents. For example, when a pulse is superimposed on U-phase current, the polarities of V-phase and W-phase currents are opposite and the magnitudes of the V-phase and W-phase currents each become half the magnitude of the U-phase current. A pulse is superimposed on three U-phase, V-phase and W-phase currents at the same timing to thereby make it possible to balance the three-phase current magnitudes, so a pulse may be superimposed on the currents of all the phases. On the other hand, a pulse does not need to be superimposed at each cycle but a pulse may be superimposed once in three cycles in each phase, and, furthermore, a pulse may be superimposed at less frequency.

In addition, the rotor currents may be changed by the magnitude of a superimposed pulse, so it is possible to determine the magnitude of a superimposed pulse on the basis of a target; instead, the rotor currents may be changed by changing the frequency at which a pulse is superimposed. Furthermore, both the magnitude of a superimposed pulse and the frequency at which a pulse is superimposed may be controlled.

In the example shown in FIG. 7, a pulse to be superimposed on the stator current has a waveform that increases the stator current. Thus, by superimposing such a pulse, rotor mean currents increase. Note that the timing at which a pulse is superimposed may also be the same timing as that of FIG. 6.

Here, the stator current varies through superimposition of a pulse; however, the stator current itself may be arbitrarily controlled through PWM control. Then, the rotary electric machine system is subjected to feedback control on the basis of a target torque, so the stator currents are increased when the output torque is smaller than the target torque and the stator currents are decreased when the output torque is larger than the target torque to thereby keep the output torque at the target torque.

In addition, the correlation between the magnitude of a pulse and the variation of each rotor current is determined in advance, in association with an operating state, such as a rotational speed, and is stored as a map, or the like, to thereby make it possible to execute appropriate rotor current control. Note that, when an ammeter is provided for the rotor 14 and then the output is acquired by a collector ring, or the like, an actual rotor current may be measured.

As described above, in order to obtain a constant torque, corresponding rotor magnetomotive force (rotor current) and stator magnetomotive force (stator current) are required, and, usually, the ratio of each of the stator magnetomotive forces and each of the rotor magnetomotive forces is determined by the configuration of the rotary electric machine 10, so it cannot be changed.

However, in the present embodiment, a pulse is superimposed to make it possible to significantly vary the rotor currents as compared with a variation in stator current, so each rotor current may be controlled arbitrarily.

That is, in the present embodiment, the ratio of each stator magnetomotive force (stator current) and each rotor magnetomotive force (rotor current) is changed by means of superimposition of a pulse. Then, the stator magnetomotive force and the rotor magnetomotive force are set such that a total copper loss at the time of obtaining the same torque is minimal. By so doing, it is possible to increase the efficiency of the rotary electric machine, and it is possible to reduce a loss.

Figure 8:
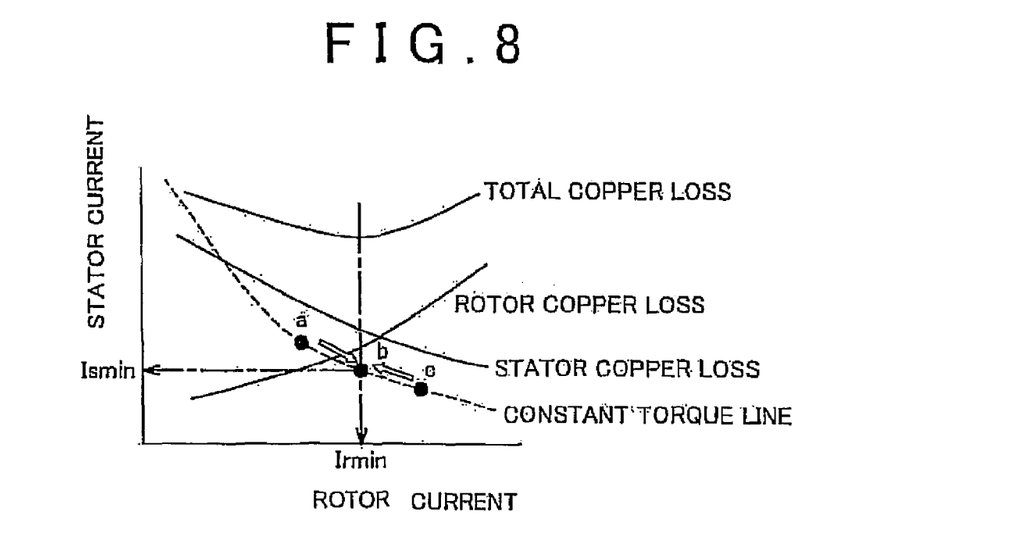
FIG. 8 is a graph that shows a rotor current and a stator current at which a copper loss is minimal.

As shown in FIG. 8, each rotor current and each stator current in the case where no pulse is superimposed is point a, each rotor current is decreased to thereby make it possible to shift to point b at which the total loss is minimal; whereas, when each rotor current and each stator current in the case where no pulse is superimposed is point c, the rotor current is increased to thereby make it possible to shift to point b at which the total loss is minimal.

Various experiments were conducted on the rotary electric machine according to the embodiment, and it was found that, as shown in FIG. 5, even when the output torque varies, the ratio of each rotor current and each stator current at which a copper loss is minimal does not change so much. In addition, the relationship between superimposition of a pulse and each rotor current may also be determined in advance. Then, it is applicable that the correlation between an output torque and a superimposed pulse at that time is stored as a map in advance and a required pulse is generated by the pulse generating unit 84.

In addition, the appropriate ratio of each rotor current and each stator current varies with the rotational speed of the rotary electric machine. Then, it is applicable that the appropriate ratio of each rotor current and each stator current is stored in consideration of the rotational speed and then the characteristic of a superimposed pulse is changed on the basis of the rotational speed.

Furthermore, in the present embodiment, each rotor magnetomotive force and each stator magnetomotive force are controlled such that a copper loss is minimal. Through the above control, magnetic fluxes in the stator and the rotor are optimal and, accordingly, an iron loss may also be optimized.

Figure 9:
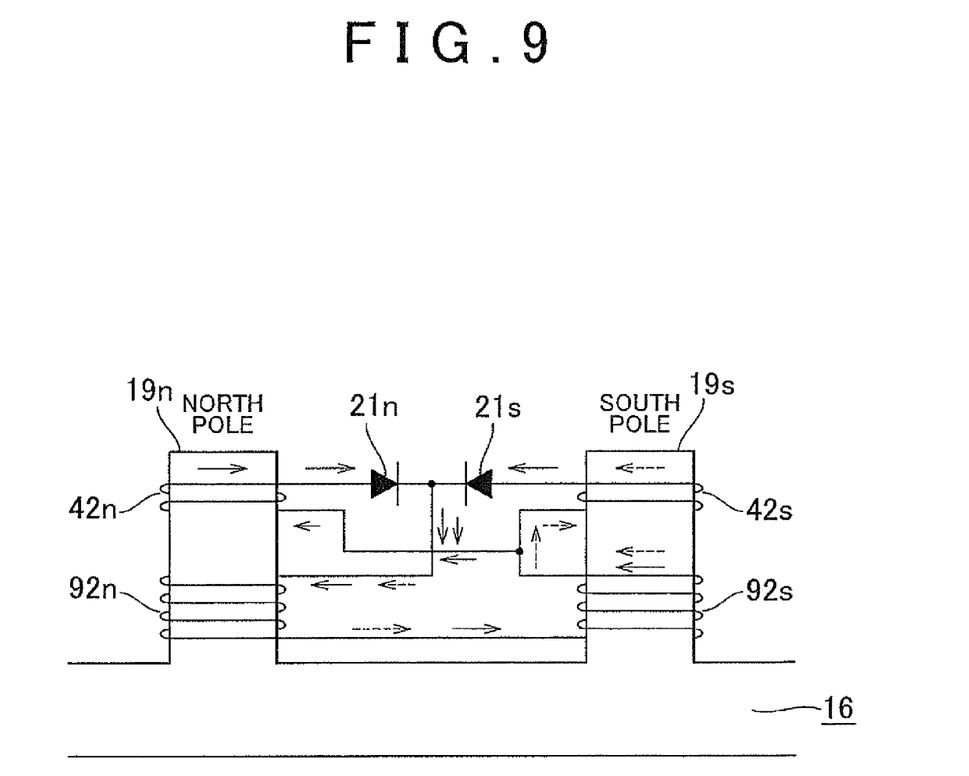
FIG. 9 is a schematic view that shows a state of currents flowing through rotor coils in another embodiment of the invention.

FIG. 9 shows another configuration example of rotor coils. In this example, a rotor coil 42n is wound around a left-side salient pole (tooth) 19n in the drawing, and a rotor coil 42s is wound around a right-side salient pole (tooth) 19s in the drawing. In addition, the anodes of the diodes 21n and 21s are respectively connected to one ends of these rotor coils 42n and 42s, and the cathodes of these diodes 21n and 21s are connected to each other. Then, one end of a common coil 92n wound at the proximal side of the salient pole 19n around which the rotor coil 42n is wound is connected to the connection point of the cathodes of the diodes 21n and 21s, and the other end of the common coil 92n is connected to one end of a common coil 92s wound at the proximal side of the salient pole 19s around which the rotor coil 42s is wound. Furthermore, the other end of the common coil 92s is commonly connected to the other ends of the rotor coils 42n and 42s.

With the above configuration, only the current in the direction regulated by the diode 21n flows through the rotor coil 42n and the salient pole 19n around which the rotor coil 42n is wound is magnetized as the north pole by that current, while only the current in the direction regulated by the diode 21s flows through the rotor coil 42s and the salient pole 19s around which the rotor coil 42s is wound is magnetized as the south pole by that current. In addition, the common coils 92n and 92s are connected in series with each other, so the currents in the directions flowing from the cathodes of the diodes 21n and 21s sequentially flows through the common coils 92n and 92s. The common coil 92n uses those currents to magnetize the salient pole 19n, around which the common coil 92n is wound, as the north pole, and the common coil 92n uses those currents to magnetize the salient pole 19s, around which the common coil 92n is wound, as the south pole.

Thus, as induced current flows through the rotor coil 42n, the current flows through the common coils 92n and 92s via the diode 21n, the salient pole 19n is magnetized as the north pole by the current flowing through the common coil 92n, and the salient pole 19s is magnetized as the south pole by the current flowing through the common coil 92s.

Figure 10:
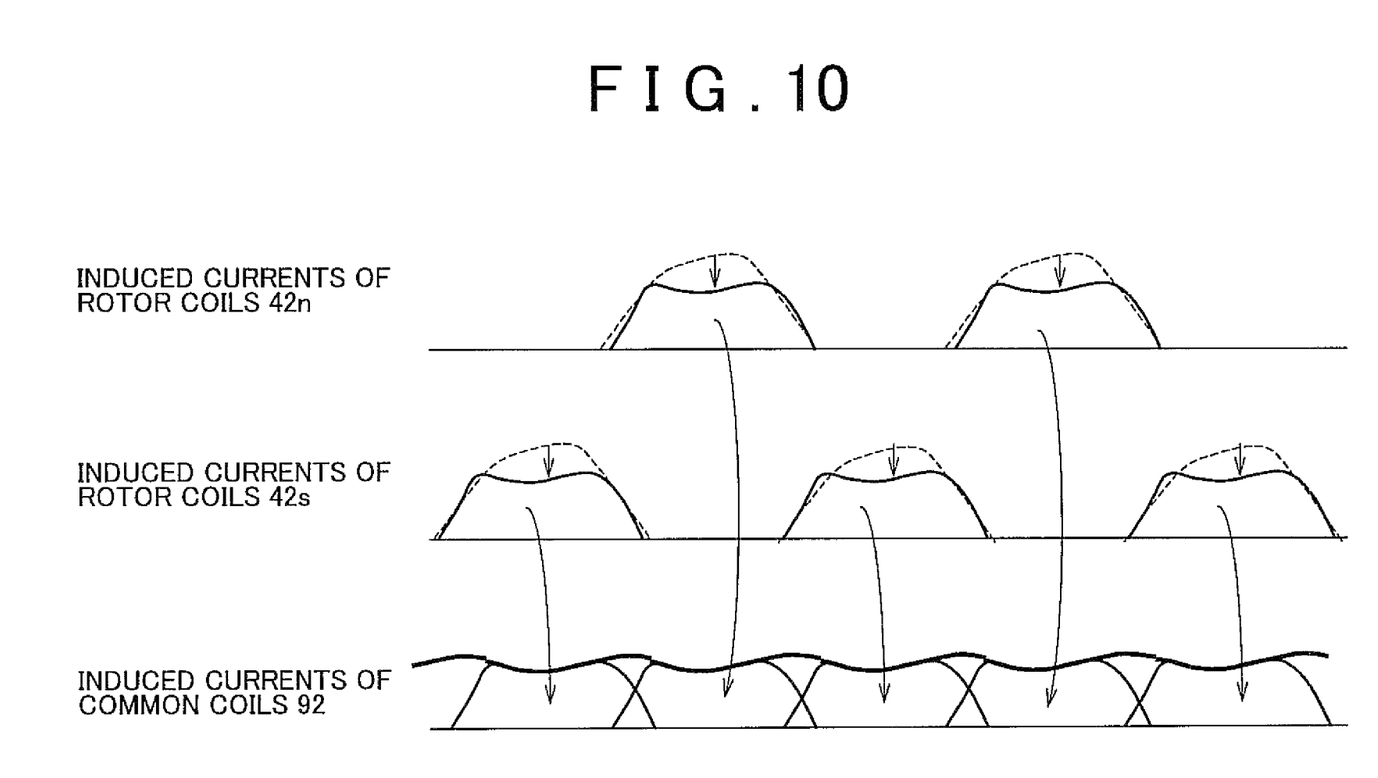
FIG. 10 is a schematic view that shows a state of currents flowing through rotor coils and common coils in another embodiment of the invention.

That is, as shown in FIG. 10, at the timing at which the salient poles 19n are magnetized as the north poles by revolving magnetic fields generated by the stator coils, induced currents flow through the rotor coils 42n and the common coils 92n and 92s. At the timing at which the salient poles 19s are magnetized as the south poles by revolving magnetic fields generated by the stator coils, induced currents flow through the rotor coils 42s and the common coils 92n and 92s. Thus, at any timing, the salient poles 19n or 19s are respectively magnetized as the north poles or the south poles by induced currents, so, at any one of the timing at which induced currents flow through the rotor coils 42n and the timing at which induced currents flow through the rotor coils 42s, the number of turns of each coil may be increased, and induced currents may be decreased. Thus, it is possible to reduce a copper loss in the rotor-side coils.

For example, when the number of turns of each of the rotor coils 42n and 42s in the case where no common coils 92n or 92s are used is 60 and, in this example, the number of turns of each of the rotor coils 42n and 42s is 20 and the number of turns of each of the common coils 92n and 92s is 40, induced currents constantly flow through the coils of 100 turns in this example. In this case, currents that flow through the rotor coils 42n and 42s may be decreased by about 40%.

Note that, when the salient poles 19n are magnetized as the north poles and the salient poles 19s are magnetized as the south poles, the diodes 21n and 21s, the winding directions of the rotor coils 42n and 42s and the winding directions of the common coils 92n and 92s may be configured in any form.

What is claimed is:

1. A rotary electric machine system comprising:
    a stator that has multi-phase stator coils and that generates stator magnetomotive forces based on respective stator currents having different phases supplied to the multi-phase stator coils;
    a rotor on which rotor coils are wound such that magnetic poles are formed by rotor currents generated in response to the stator magnetomotive forces generated by the stator;
    a regulating unit that regulates a flow direction of each of the rotor currents to one direction to thereby regulate a polarity of each of the magnetic poles; and
    a control unit that controls currents supplied to the stator coils on the basis of a target torque,
    wherein the control unit superimposes a pulse on the stator currents and changes the pulse to adjust the ratio of each of the stator currents and each of the rotor currents so as to minimize a copper loss in the stator and the rotor.

2. The rotary electric machine system according to claim 1, wherein the control unit controls the ratio of each of the stator currents and each of the rotor currents to a predetermined value.

3. The rotary electric machine system according to claim 1, wherein the control unit controls a magnitude of a superimposed pulse on the basis of the target torque to thereby control currents supplied to the stator coils.

4. The rotary electric machine system according to claim 1, wherein the control unit controls a frequency of superimposition of the pulse on the basis of the target torque to thereby control currents supplied to the stator coils.

5. The rotary electric machine system according to claim 1, further comprising a detector that detects a rotational speed of the rotary electric machine,
    wherein the control unit changes a characteristic of a superimposed pulse on the basis of the rotational speed of the rotary electric machine.

6. The rotary electric machine system according to claim 2, wherein the ratio of each of the stator currents and each of the rotor currents is set to a substantially constant value.

7. The rotary electric machine system according to claim 6, wherein each of the rotor currents, divided by each of the stator currents, is set to about 1.2.

8. A rotary electric machine system comprising:
    a stator that has multi-phase stator coils and that generates stator magnetomotive forces based on respective stator currents having different phases supplied to the multi-phase stator coils;
    a rotor on which rotor coils are wound such that magnetic poles are formed by rotor currents generated in response to the stator magnetomotive forces generated by the stator;
    a regulating unit that regulates a flow direction of each of the rotor currents to one direction to thereby regulate a polarity of each of the magnetic poles; and
    a control unit that controls currents supplied to the stator coils on the basis of a target torque,
    wherein the control unit superimposes a pulse on the stator currents and changes at least one of a magnitude of the pulse and a frequency of superimposition of the pulse to adjust the ratio of each of the stator currents and each of the rotor currents so as to minimize a copper loss in the stator and the rotor.

9. The rotary electric machine system according to claim 8, wherein the control unit controls the ratio of each of the stator currents and each of the rotor currents to a predetermined value.

10. The rotary electric machine system according to claim 8, wherein the control unit controls the magnitude of the pulse on the basis of the target torque to thereby control currents supplied to the stator coils.

11. The rotary electric machine system according to claim 8, wherein the control unit controls the frequency of superimposition of the pulse on the basis of the target torque to thereby control currents supplied to the stator coils.

12. The rotary electric machine system according to claim 8, further comprising a detector that detects a rotational speed of the rotary electric machine,
 wherein the control unit changes a characteristic of the pulse on the basis of the rotational speed of the rotary electric machine.

13. The rotary electric machine system according to claim 9, wherein the ratio of each of the stator currents and each of the rotor currents is set to a substantially constant value.

14. The rotary electric machine system according to claim 13, wherein each of the rotor currents, divided by each of the stator currents, is set to about 1.2.

* * * * *